United States Patent [19]
Lee et al.

[11] Patent Number: 5,143,966
[45] Date of Patent: Sep. 1, 1992

[54] VINYL ACETATE/ETHYLENE COPOLYMER EMULSIONS HAVING IMPROVED WET TACK PROPERTIES

[75] Inventors: Hsueh-Chi Lee; William E. Lenney, both of Allentown, Pa.

[73] Assignee: Air Products and Chemicals, Inc., Allentown, Pa.

[21] Appl. No.: 609,960

[22] Filed: Nov. 7, 1990

[51] Int. Cl.$^5$ .......................... C08F 2/30; C08F 18/08; C08L 31/04; C08L 29/04
[52] U.S. Cl. ...................... 524/459; 524/503
[58] Field of Search .................... 524/503, 459

[56] References Cited

U.S. PATENT DOCUMENTS

| | | | |
|---|---|---|---|
| 3,827,996 | 8/1974 | Beresniewicz | 260/29.6 |
| 4,043,961 | 8/1977 | Beresniewicz | 260/29.6 |
| 4,521,561 | 6/1985 | Hausman | 524/459 |
| 4,605,589 | 8/1986 | Orphanides | 428/290 |

*Primary Examiner*—Paul R. Michl
*Assistant Examiner*—Peter Szekely
*Attorney, Agent, or Firm*—Michael Leach; James C. Simmons; William F. Marsh

[57] ABSTRACT

In a vinyl acetate-ethylene copolymer emulsion prepared by the aqueous emulsion copolymerization of vinyl acetate and ethylene in the presence of a polyvinyl alcohol stabilizing system, the improvement which comprises a vinyl acetate-ethylene copolymer emulsion prepared in the presence of a stabilizing system consisting essentially of:

(a) 0.2 top 1.5 wt % low molecular weight, partially hydrolyzed polyvinyl alcohol,
(b) 0.5 to 2.5 wt % medium molecular weight, partially hydrolyzed polyvinyl alcohol, and
(c) 1 to 4 wt % medium molecular weight and/or high molecular weight, fully hydrolyzed polyvinyl alcohol, the weight percentages based on vinyl acetate monomer.

9 Claims, No Drawings

VINYL ACETATE/ETHYLENE COPOLYMER EMULSIONS HAVING IMPROVED WET TACK PROPERTIES

TECHNICAL FIELD

The invention relates to vinyl acetate/ethylene copolymer emulsions prepared in the presence of a polyvinyl alcohol stabilizing system.

BACKGROUND OF THE INVENTION

In water-based paper laminating adhesive applications, it is often necessary for the adhesive to have both (1) a high degree of wet tack and (2) a sufficient open tack time (tack range) to bond the substrate quickly and successfully under a light to moderate pressure. However, it has proven to be difficult to develop an adhesive system having both important wet tack characteristics. Several methods have been utilized in the past to achieve optimum wet tack performance properties. For instance, water-based laminating adhesives have been prepared in the presence of boron-modified polyvinyl alcohols to enhance the wet tack properties. However, these adhesives are sensitive to the pH of the system, and tend to form useless gels at relatively high pH. In addition, the wet tack performance of the adhesive could be pH dependent.

Another method to enhance the wet tack performance is to compound solvents or plasticizers into the base adhesives. This method is often used by the end users of the packaging industry. The use of solvents, however, could create environmental concerns and safety issues. Also, the performance of plasticized adhesives could deteriorate because of plasticizer migration. Moreover, formulating the adhesives with solvent or plasticizers will add raw material and operating costs to the converters.

Another important property required by the industry is a relatively fast setting speed, the adhesive's ability to set a bond rapidly and to maintain this bond after a short application of pressure.

As the environmental regulations become more stringent and the current trend of the packaging industry moves toward high-speed applications, it is urgent to develop water-based adhesives having both high wet tack and sufficient tack range properties in addition to fast speed of set to respond the growing needs of the industry.

U.S. Pat. No. 3,827,996 discloses aqueous dispersions of vinyl ester polymers prepared in the presence of a stabilizing amount of polyvinyl alcohol having an average residual vinyl acetate content of 5 to 7 mole %. A single polyvinyl alcohol having this vinyl acetate content may be used or a combination of polyvinyl alcohols having average vinyl acetate contents of up to about 16 mole % may be blended to produce an average to 5 to 7 mole %. The resulting vinyl ester polymer dispersions are said to possess stability, both during and after preparation, water resistance of the adhesive after it has been deposited from the dispersion and a satisfactory viscosity index.

U.S. Pat. No. 4,521,561 discloses a vinyl acetate/ethylene copolymer emulsion exhibiting both partially- and fully-hydrolyzed polyvinyl alcohol compatibility which comprises an aqueous collodial dispersion of a copolymer prepared by the emulsion polymerization of vinyl acetate and ethylene in the presence of a polyvinyl alcohol stabilizing system having an 8 to 10 mole % residual vinyl acetate content, especially comprising a mixture of a polyvinyl alcohol having a 3 to 6 mole % vinyl acetate content and a polyvinyl alcohol having a 10 to 14 mole % vinyl acetate content in the ratio that yields an average residual vinyl acetate content of 8 to 10 mole %. When blended with a partially- or fully-hydrolyzed polyvinyl alcohol to provide an adhesive composition, such compositions demonstrate an enhanced plasticizer thickening.

U.S. Pat. No. 4,605,589 discloses a vinyl acetate/ethylene copolymer binder emulsion prepared by the copolymerization of vinyl acetate and ethylene in the presence of a polyvinyl alcohol which is 50 to 99 mole % hydrolyzed and has a 100 to 375 degree of polymerization (DPn) such that it demonstrates a viscosity of about 2.4 to 4 as a 4% aqueous solution at 20° C. Nonwoven fabrics bonded with such copolymers possess surprisingly improved softness while maintaining toughness.

U.S. Pat. No. 4,043,961 discloses adhesive compositions consisting essentially of an aqueous emulsion of vinyl acetate/ethylene copolymer prepared in the presence of protective colloid comprising fully hydrolyzed vinyl alcohol copolymer containing methyl methacrylate. The examples show the use of such vinyl alcohol copolymer in combination with a medium and/or low viscosity partially hydrolyzed polyvinyl alcohol and a nonionic surfactant.

SUMMARY OF THE INVENTION

The present invention provides an aqueous dispersion, or emulsion, of vinyl acetate-ethylene (VAE) copolymers which are useful as paper laminating adhesives having both high wet tack and improved tack range properties as well as a relatively fast speed of set. The VAE copolymer is dispersed in an aqueous medium and is prepared by the aqueous emulsion copolymerization of vinyl acetate and ethylene in the presence of a stabilizing system consisting essentially of (1) a low molecular weight, partially hydrolyzed polyvinyl alcohol, (2) a medium molecular weight, partially hydrolyzed polyvinyl alcohol and (3) a medium and/or high molecular weight, fully hydrolyzed polyvinyl alcohol.

In a preferred embodiment for making VAE copolymer emulsion, the pre-emulsion is prepared by a reverse premixing process in which the vinyl acetate monomer is first charged to the polymerization reaction vessel followed by the aqueous premix comprising the polyvinyl alcohol (PVOH) stabilizing system in water.

The invention provides new VAE emulsions having improved tack range ratings without sacrificing the wet tack values. Other important performance properties such as a fast setting speed and creep resistance are maintained.

DETAILED DESCRIPTION OF THE INVENTION

The copolymers according to the invention comprise 70–98 wt % vinyl acetate and 2–30 wt % ethylene, on a monomer basis, to provide a Tg ranging from about −15° to 30° C., preferably the copolymer contains 90–95 wt % vinyl acetate and 5–10 wt % ethylene.

The vinyl acetate-ethylene copolymers may optionally include one or more additional ethylenically unsaturated copolymerizable monomers. Examples of such comonomers which may be present at up to 10 wt % include, for example, butyl acrylate, 2-ethylhexyl acrylate, acrylic acid, hydroxyethyl acrylate, hydroxypropyl acrylate, and N-methylolacrylamide.

Contemplated as the functional, or operative, equivalent of vinyl acetate in the copolymer emulsions are vinyl esters of alkanoic acids, such as vinyl formate, vinyl propionate, vinyl laurate and the like.

The stabilizing system for the copolymerization reaction to prepare the VAE copolymer emulsion adhesives is used in an amount of 3.5 to 6 wt %, preferably 4 to 5 wt %, based on vinyl acetate monomer, and consists essentially of:

(1) 0.2 to 1.5 wt %, preferably 0.3 to 0.7 wt %, low molecular weight, partially hydrolyzed PVOH;

(2) 0.5 to 2.5 wt %, preferably 1 to 2 wt %, medium molecular weight, partially hydrolyzed PVOH; and (3) 1 to 4 wt %, preferably 2 to 3 wt %, medium molecular weight, fully hydrolyzed PVOH or high molecular weight, fully hydrolyzed PVOH, or mixtures thereof.

The low molecular weight, partially hydrolyzed PVOH which can be used in the stabilizing system is 85-90 mole % hydrolyzed, especially 87-89 mole % hydrolyzed, and has a degree of polymerization (DPn) ranging from 100 to 800, preferably 200 to 600, most desirably 450 to 600. The medium molecular weight, partially hydrolyzed PVOH is 85-90, especially 87-89, mole % hydrolyzed and has a DPn ranging from 1000 to 1800, preferably 1400 to 1700. The fully hydrolyzed PVOH's are 98 to 99+, especially 98 to 99, mole % hydrolyzed and have a DPn ranging from 1000 to 1800, preferably 1400 to 1700, for the medium molecular weight PVOH and from 1900 to 3000, preferably 2000 to 2500, for the high molecular weight PVOH. Suitable PVOH's are marketed by Air Products and Chemicals, Inc. under the trademark AIRVOL ® as grade designations 205, 523, 325 and 350, respectively.

In addition to the PVOH components the stabilizer system may also contain minor amounts of conventional surfactants such as the nonionic polyalkoxylated surfactants and anionic surfactants.

Various free-radical forming sources can be used in carrying out the polymerization of the monomers, such as conventional peroxide compounds. Combination-type systems employing both conventional oxidizing agents and reducing agents can also be used, i.e., a redox system.

The oxidizing agent is generally employed in an amount of 0.01-1%, preferably 0.05-0.5%, based on the weight of the vinyl acetate introduced into the polymerization system. The reducing agent is ordinarily added as an aqueous solution in the necessary equivalent amount.

A preferred composition of the VAE copolymer emulsion would comprise the following:

| | |
|---|---|
| Water | 45% |
| Solids | 55% |
| VAM | 88% |
| Ethylene | 7.5% |
| AIRVOL 205 PVOH | 0.5% |
| AIRVOL 523 PVOH | 1.5% |
| AIRVOL 325 PVOH | 2.5% |

In general, suitable VAE copolymer emulsions can be prepared by the copolymerization of the monomers in the presence of the PVOH stabilizing system in an aqueous medium under ethylene pressures up to about 100 atm using a redox system which is added incrementally. The process first involves the homogenization in which the vinyl acetate suspended in water is thoroughly agitated in the presence of ethylene under the working pressure to effect solution of the ethylene and the vinyl acetate while the reaction medium is gradually heated to polymerization temperature. The homogenization period is followed by a polymerization period during which the redox system is added incrementally.

The reaction temperature can be controlled by the rate of redox addition and the rate of heat dissipation. Generally, it is advantageous to maintain a mean temperature of about 75° C. during the polymerization of the monomers and to avoid temperatures much in excess of 80° C.

A preferred method for producing the VAE copolymer emulsions is a "cold initiation" process which involves adjusting the reaction mixture to a temperature from about 10° to 30° C. Polymerization is initiated by addition of the free radical source at a rate such that the reaction mixture is brought to a temperature of 45° to 85° C., preferably about 75° C., within a period of about one hour. The polymerization is continued at the desired temperature until less than 0.5% of the vinyl acetate remains unreacted.

In carrying out the polymerization, an amount of the vinyl acetate is initially charged to the polymerization vessel containing the aqueous solution of the PVOH stabilizing system. Most advantageously all of the vinyl acetate is initially charged to the reaction medium with no additional incremental supply. It is also contemplated that at least about 50% of the total vinyl acetate to be polymerized can be initially charged with the remainder of the vinyl acetate added incrementally during the course of the polymerization. In the preferred mode, the vinyl acetate monomer is first charged to the reaction vessel followed by the aqueous PVOH stabilizing system premix.

When reference is made to incremental addition, substantially uniform additions, both respect to quantity and time, are contemplated. Such additions can be continuous or discontinuous and are also referred to as "delayed" additions.

The quantity of ethylene entering into the copolymer is influenced by pressure, agitation and viscosity of the polymerization medium. Thus, to increase the ethylene content of the copolymer, high pressures, greater agitation and a low viscosity are employed. The pressurized ethylene source can be shut off from the reactor so that the ethylene pressure decays as it is polymerized or it can be kept open to maintain the ethylene pressure throughout the reaction, i.e., make-up ethylene.

After thoroughly agitating the aqueous reaction mixture to dissolve ethylene in the vinyl acetate and in the water phase, the charge is brought to polymerization temperature and polymerization is then initiated by introducing initial amounts of the oxidant and the reductant. After polymerization has started, the oxidant and reductant are incrementally added as required to continue polymerization. And a third copolymerizable monomer and the remaining vinyl acetate, if any, may be added as separate delays.

The reaction is generally continued until the residual vinyl acetate content is below about 0.5%, the completed reaction product is then allowed to cool to about room temperature while sealed from the atmosphere. The pH is then suitably adjusted to a value in the range of 4.5 to 7, especially 4.5 to 5, to insure maximum stability.

VAE copolymer emulsions can be directly produced having a solids content of about 52 to 58 wt %.

The VAE copolymer emulsions of the following Examples were tested for wet tack and tack range by applying a dollop of the emulsion being tested, about 2 cm in diameter, to 50 pound Kraft paper. The emulsion is spread on the paper with a finger to make a thin film. The film is pressed with the finger and removed rapidly. The force needed to separate the film from the finger is judged and compared against a control. This force is "wet tack". "Tack range" is the time period during which the film remains tacky.

EXAMPLE 1

The following is a general procedure for preparing the VAE copolymer emulsions of the invention.

The components of the initial reactor charge and the various delay feeds were as follows:

| Initial Reactor Charge | |
|---|---|
| AIRVOL 205 PVOH[a] (10% aq soln) | 84.5 g |
| AIRVOL 523 PVOH[b] (10% aq soln) | 238.7 g |
| AIRVOL 325 PVOH[c] (10% aq soln) | 424.3 g |
| Water (deionized) | 568.0 ml |
| Ferrous Ammonium Sulfate (10% aq soln) | 4.8 ml |
| Acetic Acid | 1.0 g |
| Vinyl Acetate | 1657.5 g |
| Ethylene - quantity to equilibrate reactor to 260 psig at 24° C. | |
| Delay Feeds | |
| (1) Hydrogen Peroxide (0.4% aq soln) | 128.2 ml |
| (2) Hydrogen Peroxide (5.0% aq soln) | 38.4 ml |
| (3) Zinc Formaldehyde Sulfoxylate (10% aq soln) | 34.8 ml |

[a]Airvol 205 - 87-89 mole % hydrolyzed; DPn = 550-600
[b]Airvol 523 - 87-89 mole % hydrolyzed; DPn = 1300-1500
[c]Airvol 325 - 98-98.8 mole % hydrolyzed; DPn = 1300-1500

The pH of the combined of the PVOH solutions and the deionized water was adjusted to 4 with the acetic acid followed by the addition of the ferrous ammonium sulfate solution.

A one gallon stainless steel reactor was filled with the above aqueous premix, and purged with nitrogen. With the mixture being agitated at 200 rpm the vinyl acetate monomer was added. The reactor was purged twice with nitrogen (30 psi) followed by one ethylene purge (30 psi) at 24° C. The agitation speed was increased to 900 rpm and the reactor was pressurized to 260 psig with ethylene (subsurface). The reactor temperature and ethylene pressure were allowed to equilibrate at 25° C. and 260 psig, respectively. The ethylene supply was shut off to the reactor.

The reaction was initiated at 24° C. by the addition of the 0.4% hydrogen peroxide at 0.4 ml/min and the 10% zinc formaldehyde sulfoxylate solution at 0.5 ml/min. One initiation was observed, the 10% zinc formaldehyde sulfoxylate delay solution was set at 0.3 ml/min. Once the initial temperature rise started to level off, temperature ramp was started to 75° C. When the temperature reached 75° C. (about 1 hour), the 0.4% hydrogen peroxide flowrate was set to hold a 10° C. ΔT (°T reaction minus °T jacket).

When the vinyl acetate free monomer level was less than about 3%, the 0.4% hydrogen peroxide delay was stopped, the agitation speed was increased to 1,000 rpm and the 10% zinc formaldehyde sulfoxylate delay was stopped. The 5% hydrogen peroxide delay was begun at 0.5 ml/min increasing to 1 ml/min over 15 min. When the 5% hydrogen peroxide delay was completed the reaction mixture was cooled to 30° C., the pH adjusted to 5 with 14% ammonium hydroxide solution and transferred to a degasser to vent off any excess ethylene pressure. Colloid 585 was then added to the degassing vessel followed by the following materials dissolved in deionized water (25 g):

| | |
|---|---|
| t-Butyl Hydroperoxide (70%) | 2.5 g |
| Sodium Acetate | 1.6 g |
| Sodium Citrate | 1.6 g |

The above solution was added at a rate of 0.5 ml/min while the contents were agitated in a degasser at 200 rpm. The emulsion product had the properties as set forth in Table 1.

EXAMPLE 2

The procedure for preparing the VAE copolymer emulsion of this example followed that of Example 1 except that the sequence to charge the aqueous premix and the vinyl acetate monomer was reversed. That is to say that the vinyl acetate was charged first, followed by the aqueous premix to prepare the pre-emulsion. Table 1shows the properties of the emulsion product of this example.

EXAMPLE 3

This example followed the procedure for Example 1 but was conducted on a larger scale in a 35 gallon reactor. The properties of this VAE emulsion are also presented in Table 1.

TABLE 1

| | Product Properties | | | | |
|---|---|---|---|---|---|
| | Example 1 | Example 2 | Example 3 | Comparative 1 | Comparative 2 |
| PVOH's (wt % based on VAM) | 0.5% AV-205 1.5% AV-523 2.5% AV-325 | 0.5% AV-205 1.5% AV-523 2.5% AV-325 + reverse premixing | 0.5% AV-205 1.5% AV-523 2.5% AV-325 | 1.8% AV-205 2.3% AV-523 | 0.5% AV-205 1.5% AV-523 2.0% AV-425 |
| Physical Properties: | | | | | |
| Solids, % | 55.4 | 55.0 | 55.1 | 55.1 | 55.2 |
| Viscosity, cps (20 rpm, RVT) | 1392 (#3) | 1607 (#3) | 1750 (#3) | 2210 (#4) | 2210 (#3) |
| Tg, °C. | 16.5 | 17.0 | 21.5 | 18.5 | 11.5 |
| pH | 5.00 | 5.11 | 5.14 | 4.56 | 4.45 |
| Acc. Sed., % | 1.1 | 1.4 | 1.7 | 2.5 | 4.1 |
| Grids (100 mesh), ppm | 66 | 284 | 98 | 78 | 77 |
| Particle size | | | | | |
| DW, microns | 1.07 | 1.00 | 0.92 | 0.92 | 1.21 |

TABLE 1-continued

| | Product Properties | | | | |
|---|---|---|---|---|---|
| | Example 1 | Example 2 | Example 3 | Comparative 1 | Comparative 2 |
| DN, microns | 0.74 | 0.84 | 0.67 | 0.71 | 0.73 |
| Polydispersity | 1.44 | 1.20 | 1.37 | 1.30 | 1.65 |
| Toluene insolubles, % | 55.6 | 58.1 | 48.3 | 59.5 | 56.5 |
| Swell Index | 12.3 | 11.6 | 11.2 | 16.2 | 14.0 |
| Adhesive Performance: | | | | | |
| Cloth/Cloth (dry), pli | 15.6 | 14.9 | 15.3 | 14.1 | 14.3 |
| Cloth/Cloth (wet), pli | 1.1 | 0.9 | 1.0 | 1.0 | 0.7 |
| Creep/Resistance, mm/min | 0.02 | 0.02 | 0.01 | 0.01 | 0.02 |
| PVC/Cloth, pli | 1.5 | 1.3 | 0.5 | 1.1 | 2.9 |
| Speed of Set, sec. | 6–9 | 6–9 | 6–9 | 9–12 | 9–12 |
| Wet Tack | 8 | 9 | 9 | 9 | 8 |
| Tack Range | 9 | 10 | 10 | 6 | 10 |

The physical and adhesive performance properties of Examples 1–3 VAE copolymer emulsions are compared to a prior art, commerically available VAE copolymer emulsion (Comparative 1) which is only stabilized with partially hydrolyzed PVOH's, AIRVOL 205 PVOH and Airvol 523 PVOH and to a prior art, commercially available VAE copolymer emulsion (Comparative 2) which uses Airvol 425 PVOH, a 95.5–96.5 mole % hydrolyzed, medium molecular weight PVOH instead of the fully hydrolyzed, medium molecular weight PVOH. The data show that the VAE copolymer emulsions according to the invention have an improved tack range rating of 9–10 versus a rating of 6 for the Comparative 1 VAE emulsion without sacrificing the wet tack values and also while demonstrating improved setting speed.

It is the presence of the particular PVOH stabilizing system that is believed to create the proper aqueous environment and chemistry to provide the combined wet tack, tack range and speed of set performance. In addition, the reverse premixing method of Example 3 provides a process for preparing VAE copolymer emulsions with narrow particle size distributions which, in turn, changes their rheological characteristic of the emulsion and proves the wet tack performance. A processing advantage also gained via reverse premixing is rapid ethylene vapor-liquid equilibrium which translates into short batch cycle and, consequently, improve productivity in VAE emulsion production.

STATEMENT OF INDUSTRIAL APPLICATION

The new VAE copolymer emulsions possessing the superior wet tack properties will allow the paper packaging industry to run converting operation at a higher speed. This also translates into reduced operating costs and improved productivity for the end users.

We claim:

1. In a vinyl acetate-ethylene copolymer emulsion prepared by the aqueous emulsion copolymerization of vinyl acetate and ethylene in the presence of a polyvinyl alcohol stabilizing system, the improvement which comprises a vinyl acetate-ethylene copolymer emulsion prepared in the presence of 3.5 to 6 wt % of a stabilizing system consisting essentially of:
   (a) 0.2 to 1.5 wt % low molecular weight, partially hydrolyzed polyvinyl alcohol,
   (b) 0.5 to 2.5 wt % medium molecular weight, partially hydrolyzed polyvinyl alcohol, and
   (c) 1 to 4 wt % medium molecular weight, fully hydrolyzed polyvinyl alcohol and/or high molecular weight, fully hydrolyzed polyvinyl alcohol, the weight percentages based on vinyl acetate monomer.

2. The copolymer emulsion of claim 1 the partially hydrolyzed polyvinyl alcohols are 85–90 mole % hydrolyzed.

3. The copolymer emulsion of claim 1 in which the fully hydrolyzed polyvinyl alcohol is 98–99+ mole % hydrolyzed.

4. The copolymer emulsion of claim 1 in which the low molecular weight polyvinyl alcohol has a DPn of 100–800.

5. The copolymer emulsion of claim 1 in which the medium molecular weight polyvinyl alcohols have a DPn of 1000–1800.

6. The copolymer emulsion of claim 1 in which the high molecular weight polyvinyl alcohol has a DPn of 1900–3000.

7. In a vinyl acetate-ethylene copolymer emulsion prepared by the aqueous emulsion copolymerization of vinyl acetate and ethylene in the presence of a polyvinyl alcohol stabilizing system, the improvement which comprises a vinyl acetate-ethylene copolymer emulsion prepared in the presence of 3.5 to 6 wt % of a stabilizing system consisting essentially of:
   (a) 0.2 to 1.5 wt % of a 87–89 mole % hydrolyzed polyvinyl alcohol having a DPn of 200–600,
   (b) 0.5 to 2.5 wt % of a 87–89 mole % hydrolyzed polyvinyl alcohol having a DPn of 1400–1700, and
   (c) 1 to 4 wt % of a 98–99+ mole % hydrolyzed polyvinyl alcohol having a DPn of 1400–1700 or 2000–2500, or mixtures thereof, the weight percentages based on vinyl acetate monomer.

8. The copolymer emulsion of claim 7 in which the stabilizing system consists essentially of:
   (a) 0.3 to 0.7 wt % of a 87–89 mole % hydrolyzed polyvinyl alcohol having a DPn of 200–600,
   (b) 1 to 2 wt % of a 87–89 mole % hydrolyzed polyvinyl alcohol having a DPn of 1400–1700, and
   (c) 2 to 3 wt % of a 98–99+ mole % hydrolyzed polyvinyl alcohol having a DPn of 1400–1700, the weight percentages based on vinyl acetate monomer.

9. The copolymer emulsion of claim 7 in which the stabilizing system consists essentially of:
   (a) 0.5 wt % of a 87–89 mole % hydrolyzed polyvinyl alcohol having a DPn of 200–600,
   (b) 1.5 wt % of a 87–89 mole % hydrolyzed polyvinyl having a DPn of 1400–1700, and
   (c) 2.5 wt % of a 98–99+ mole % hydrolyzed polyvinyl alcohol having a DPn of 1400–1700, the weight percentages based on vinyl acetate monomer.

* * * * *